W. F. LENT.
GREASE CUP.
APPLICATION FILED DEC. 30, 1918.

1,318,392.

Patented Oct. 14, 1919.

Inventor:
Wilmar F. Lent,
by Robert Catur,
Att'ys.

UNITED STATES PATENT OFFICE.

WILMAR F. LENT, OF NEW HAVEN, CONNECTICUT, ASSIGNOR TO THE GREIST MANUFACTURING COMPANY, A CORPORATION OF CONNECTICUT.

GREASE-CUP.

1,318,392.  Specification of Letters Patent.  Patented Oct. 14, 1919.

Application filed December 30, 1918. Serial No. 268,934.

*To all whom it may concern:*

Be it known that I, WILMAR F. LENT, a citizen of the United States, residing at New Haven, in the county of New Haven and State of Connecticut, have invented or discovered certain new and useful Improvements in Grease-Cups, of which the following is a specification, reference being had therein to the accompanying drawing.

This invention relates to grease cups adapted to hold a soft or semi-liquid lubricant which is forced outward by a screw-operated piston or plunger, and the invention has for its object to provide a grease cup, of the class referred to, with a grease receptacle which may be conveniently adjusted or removed for refilling even when the grease cup is located in a somewhat inaccessible position. To this end the invention comprises a swinging grease receptacle pivotally mounted on a frame part provided with means for attaching the same to a bearing, said swinging receptacle being encircled by a collar with which it has a threaded connection so that it may be screwed upward or outward slightly to release its bottom or inward portion from the frame part when it is to be swung upward or outward on its pivot, and when thus swung upward or outward said receptacle may be refilled without being removed; or, optionally, a reverse unscrewing will release said receptacle from the threaded collar or sleeve so that the receptacle may be removed for refilling. When the receptacle has been filled it may again be partly screwed into the collar and may then be returned to an upright position and be screwed downward or inward so as to be retained in operative position relative to said frame part.

Figure 1:
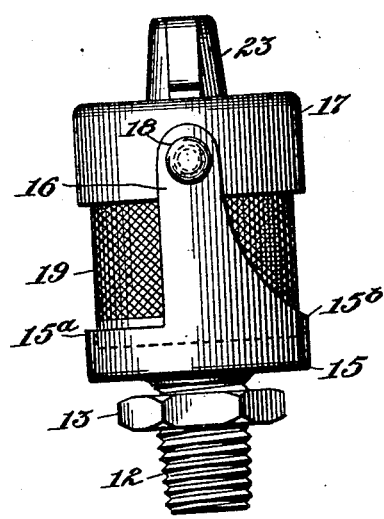
Figure 2:
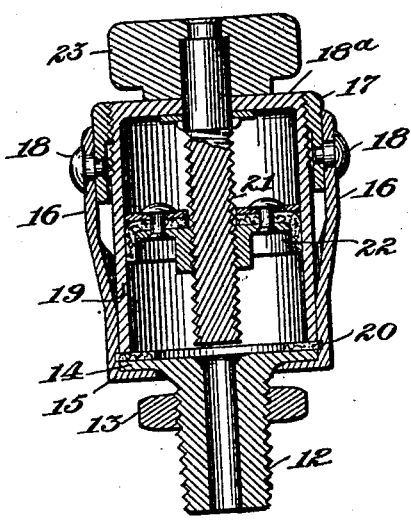
Figure 3:
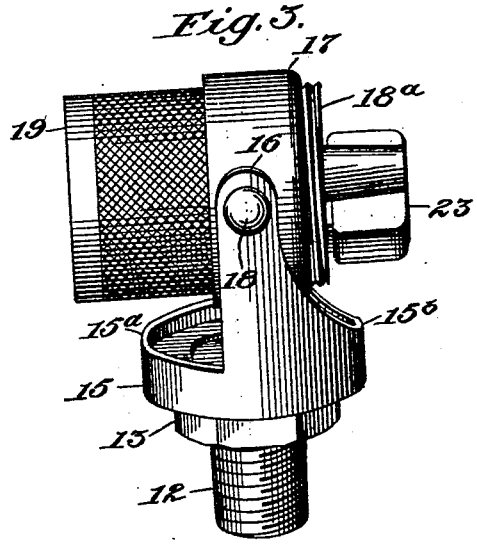

In the accompanying drawing Figure 1 is a side view of the improved grease cup, and Fig. 2 a central vertical section of the same, the parts being in operative position in both of these views. Fig. 3 is a perspective view showing the grease receptacle swung out on its pivotal connection with the frame part so as to be in position to be filled or to be removed for refilling.

Referring to the drawing, 12 denotes a hollow threaded nipple adapted to be screwed into a bearing and which is provided with a lock-nut 13 for retaining the same in place. The nipple 12 has a flanged upper portion 14 which is attached in any suitable manner to the base 15 of the frame part comprising upwardly extending arms 16 to the upper portion of which is attached an internally threaded sleeve or collar 17 pivotally connected to the arms 16 by pins or rivets 18. The hollow grease receptacle or holder 19 is cylindrical in form and has a screw-threaded upper or outer portion engaging the internally threaded sleeve or collar 17, the said grease cup receptacle or holder preferably having a slightly knurled or roughened outer frictional surface, as denoted in the drawing, so that it may be readily turned to screw it up and down or into or out of the threaded sleeve or collar 17.

The base 15 of the frame has an upwardly extending circular flange or lip within which the lower end of the grease receptacle or holder 19 closely fits, said flange preferably comprising one side part $15^a$ which is somewhat lower than the opposite side part $15^b$. Thus when the said receptacle or holder is screwed upwardly slightly, counter clockwise, it will be lifted above the lower side part $15^a$ of the flange so that it may be swung upward or outward as shown in Fig. 3 of the drawing, and when in this position it may be refilled, or, by a few clock-wise turns, it may be screwed out of the sleeve or collar 17, and when it has been refilled and again screwed into the said sleeve or collar and is returned to its vertical position it will come in contact with the higher side part $15^b$ of said flange which will serve as a stop to limit its downwardly swinging movement and cause it to be in proper position to be again screwed downward in the sleeve or collar 17 and within the said flange, so as to tightly close its lower end against a washer 20 overlying the flanged upper portion of the screw-threaded nipple 12.

Having a swiveled connection of well known construction with the top portion $18^a$ of the grease receptacle or holder 19 is an adjusting screw 21 on which is mounted a plunger or piston 22 comprising a usual cup leather part to make it tightly fit the interior of the said grease holder 19, said piston or plunger being prevented from turning with the said screw in any well known manner. To the top of the screw 21 is fixed a winged nut 23 by which it may be turned to adjust the piston or plunger in or out. Of course it will be understood that when the grease receptacle or holder is to be filled the piston or plunger 22 will first be screwed up to the top or outer part thereof.

From the foregoing it will be understood that the invention provides a grease cup of simple construction the receptacle or grease holder of which may be quickly adjusted or removed for refilling and may then be easily and quickly replaced in an operative position.

Having thus described my invention I claim and desire to secure by Letters Patent:

1. In a grease cup, the combination with a suitable frame part, of a grease receptacle pivotally and separately connected with said frame part so that it may be turned outward or removed for refilling, means for attaching the grease cup to a bearing, and means for forcing the lubricant outward from said receptacle.

2. In a grease cup, the combination with a suitable frame part, of a grease receptacle separably connected with said frame part so that it may be taken out for refilling, means for attaching the grease cup to a bearing, means for forcing the lubricant outward therefrom, said grease receptacle having at its outer part an externally screw-threaded portion, and an internally screw-threaded sleeve or collar pivotally attached to said frame part and in which said screw-threaded portion of said grease receptacle fits.

3. In a grease cup, the combination with a frame part comprising a base having upwardly extending arms, of an internally screw-threaded sleeve or collar pivotally attached to said arms, a grease receptacle having an externally screw-threaded portion fitting within said sleeve or collar, whereby said receptacle may be conveniently refilled without being removed, or may, if desired, be removed for refilling, means for forcing a lubricant outward from said receptacle, and a hollow screw-threaded nipple, to which said frame part is attached, for securing the grease cup to a bearing.

4. In a grease cup, the combination with a frame part comprising a base having upwardly extending arms and an upwardly extending flange, of an internally screw-threaded sleeve or collar pivotally attached to said arms, a grease receptacle having an externally screw-threaded portion fitting within said sleeve or collar, whereby said receptacle may be conveniently refilled without being removed, or may, if desired, be removed for refilling, means for forcing a lubricant outward from said receptacle, and a hollow screw-threaded nipple, to which said frame part is attached, for securing the grease cup to a bearing.

In testimony whereof I affix my signature.

WILMAR F. LENT.

Copies of this patent may be obtained for five cents each, by addressing the "Commissioner of Patents, Washington, D. C."